United States Patent
Bolton et al.

(10) Patent No.: US 6,197,853 B1
(45) Date of Patent: Mar. 6, 2001

(54) POLYCARBONATE COMPOSITION RESISTANT TO GAMMA RADIATION

(75) Inventors: Daniel H. Bolton, Beaver Falls; Sivaram Krishnan, Pittsburgh; David M. Derikart, Natrona Heights; James B. Johnson, Washington, all of PA (US)

(73) Assignee: Bayer Corporation, Pittsburgh, PA (US)

( * ) Notice: Subject to any disclaimer, the term of this patent is extended or adjusted under 35 U.S.C. 154(b) by 0 days.

(21) Appl. No.: 09/346,238

(22) Filed: Jul. 1, 1999

(51) Int. Cl.$^7$ ............................................. C08K 5/15
(52) U.S. Cl. ........................ 524/108; 524/111; 523/135; 523/136
(58) Field of Search ..................... 523/135, 136, 523/111, 125, 137; 524/340, 180, 110, 111, 611; 428/900, 695, 694

(56) References Cited

U.S. PATENT DOCUMENTS

| | | | |
|---|---|---|---|
| 4,576,982 | * 3/1986 | Tyrell et al. | 524/84 |
| 4,624,972 | 11/1986 | Nace | 523/136 |
| 4,804,692 | 2/1989 | Lundy et al. | 523/137 |
| 4,873,271 | * 10/1989 | Lundy et al. | 523/136 |
| 4,874,802 | 10/1989 | Lundy et al. | 524/94 |
| 4,963,598 | * 10/1990 | Krishnan et al. | 523/137 |
| 5,006,572 | 4/1991 | Lundy et al. | 523/136 |
| 5,145,751 | * 9/1992 | Kanai | 428/694 |
| 5,187,208 | 2/1993 | Rodenhouse | 523/136 |
| 5,187,211 | 2/1993 | Lundy et al. | 524/107 |
| 5,214,078 | 5/1993 | Powell et al. | 523/136 |
| 5,274,009 | 12/1993 | Grigo et al. | 523/137 |
| 5,280,050 | 1/1994 | Powell et al. | 523/136 |

* cited by examiner

*Primary Examiner*—Edward J. Cain
*Assistant Examiner*—Katarzyna Wyrozebski-Lee
(74) *Attorney, Agent, or Firm*—Joseph C. Gil; Aron Preis

(57) ABSTRACT

A thermoplastic polycarbonate molding composition having improved resistance to gamma radiation-induced yellowing is disclosed. Particularly suitable for the manufacture of devices geared for medical applications, the composition contains an additive amount of a stabilizing compound conforming structurally to

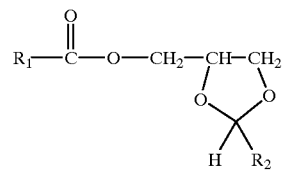

where $R_1$ denotes a $C_{1-30}$-alkyl group and $R_2$ denotes an aryl radical.

8 Claims, No Drawings

POLYCARBONATE COMPOSITION RESISTANT TO GAMMA RADIATION

The invention is directed to transparent thermoplastic molding compositions and more particularly to a polycarbonate molding composition having improved resistance to gamma radiation-induced yellowing.

SUMMARY OF THE INVENTION

A thermoplastic polycarbonate molding composition having improved resistance to gamma radiation-induced yellowing is disclosed. Particularly suitable for the manufacture of devices geared for medical applications, the composition contains an additive amount of a stabilizing compound conforming structurally to

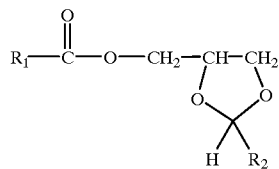

where $R_1$ denotes a $C_{1-30}$-alkyl group and $R_2$ denotes an aryl radical.

BACKGROUND OF THE INVENTION

Because of their physical and mechanical properties, polycarbonate resins were found to be eminently suitable for a variety of applications in the medical field. However, those applications, which require sterilization by exposure to ionizing radiation, present a problem since polycarbonate tends to yellow and show increased haze. The relevant art is noted to include U.S. Pat. No. 4,624,972 which disclosed polycarbonate compositions resistant to gamma radiation containing an ester of aromatic polycarboxylic acid and monoalkyl or monoaryl ether of polyglycol. The properties of relevant compositions containing esters based on primary alcohols are disclosed in the '972 document.

U.S. Pat. No. 4,873,271 disclosed a gamma radiation resistant polycarbonate composition containing an ester of a poly(alkylene) oxide as a stabilizer. Also relevant are the following U.S. Patents, all of which relate to polycarbonate compositions rendered resistant to gamma radiation by the incorporation of a stabilizing agent U.S. Pat. Nos.: 5,187,211; 4,804,692; 4,963,598; 4,874,802; 5,006,572; 5,187,208; 5,274,009 and 5,214,078. Lastly, U.S. Pat. No. 5,280,050 disclosed a polycarbonate composition containing a poly(alkylene) oxide oligomer and a halogenated aromatic phthalic acid ester of a primary alcohol. U.S. Pat. No. 5,145,751 is noted for its disclosure of a magnetic recording medium which contains a non-magnetic substrate and a magnetic recording layer coated on the substrate. The magnetic recording layer contains a compound embracing the stabilizer of the present invention.

DETAILED DESCRIPTION OF THE INVENTION

The thermoplastic composition in accordance with the present invention comprises a polycarbonate resin and about 0.1 to 2, preferably 0.1 to 1 percent, relative to the weight of the polycarbonate, of a stabilizing compound conforming to

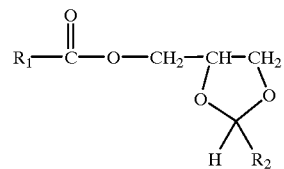

where $R_1$ denotes a $C_{1-30}$-alkyl group and $R_2$ denotes an aryl radical.

Suitable polycarbonate resins for preparing the copolymer of the present invention are homopolycarbonates and copolycarbonates and mixtures thereof.

The polycarbonates generally have a weight average molecular weight of 10,000 to 200,000, preferably 15,000 to 80,000 and their melt flow rate, per ASTM D-1238 at 300° C., is about 1 to about 95 g/10 min., preferably about 2 to 15 g/10 min. They may be prepared, for example, by the known diphasic interface process from a carbonic acid derivative such as phosgene and dihydroxy compounds by polycondensation (see German Offenlegungsschriften 2,063,050; 2,063,052; 1,570,703; 2,211,956; 2,211,957 and 2,248,817; French Patent 1,561,518; and the monograph by H. Schnell, "Chemistry and Physics of Polycarbonates", Interscience Publishers, New York, N.Y., 1964, all incorporated herein by reference).

In the present context, dihydroxy compounds suitable for the preparation of the polycarbonates of the invention conform to the structural formulae (1) or (2).

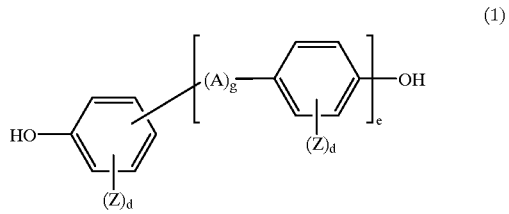

(1)

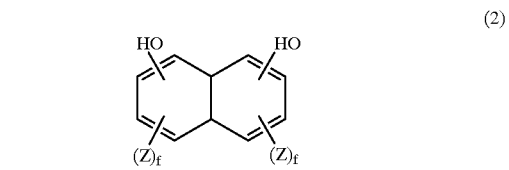

(2)

wherein

A denotes an alkylene group with 1 to 8 carbon atoms, an alkylidene group with 2 to 8 carbon atoms, a cycloalkylene group with 5 to 15 carbon atoms, a cycloalkylidene group with 5 to 15 carbon atoms, a carbonyl group, an oxygen atom, a sulfur atom, —SO— or —SO$_2$ or a radical conforming to

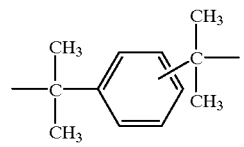

e and g both denote the number 0 to 1;

Z denotes F, Cl, Br or $C_1$–$C_4$-alkyl and if several Z radicals are substituents in one aryl radical, they may be identical or different from one another;

d denotes an integer from 0 to 4; and f denotes an integer from 0 to 3.

Among the dihydroxy compounds useful in the practice of the invention are hydroquinone, resorcinol, bis-(hydroxyphenyl)-alkanes, bis-(hydroxyphenyl)-ethers, bis-(hydroxyphenyl)-ketones, bis-(hydroxyphenyl)-sulfoxides, bis-(hydroxyphenyl)-sulfides, bis-(hydroxyphenyl)-sulfones, dihydroxydiphenyl cycloalkanes, and α, α-bis-(hydroxyphenyl)-diisopropyl-benzenes, as well as their nuclear-alkylated compounds. These and further suitable aromatic dihydroxy compounds are described, for example, in U.S. Pat. Nos. 5,227,458; 5,105,004; 5,126,428; 5,109,076; 5,104,723; 5,086,157; 3,028,356; 2,999,835; 3,148,172; 2,991,273; 3,271,367; and 2,999,846, all incorporated herein by reference.

Further examples of suitable bisphenols are 2,2-bis-(4-hydroxy-phenyl)-propane (bisphenol A), 2,4-bis-(4-hydroxyphenyl)-2-methyl-butane, 1,1 -bis-(4-hydroxyphenyl )-cyclohexane, α,α'-bis-(4-hydroxyphenyl)-p-diisopropylbenzene, 2,2-bis-(3-methyl-4-hydroxyphenyl)-propane, 2,2-bis-(3-chloro4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulfide, bis-(3,5-dimethyl-4-hydroxyphenyl)-sulfoxide, bis-(3,5-dimethyl-4-hydroxyphenyl)-sulfone, dihydroxy-benzophenone, 2,4-bis-(3,5-dimethyl-4-hydroxyphenyl)-cyclohexane, α,α'-bis-(3,5-dimethyl-4-hydroxyphenyl)-p-diisopropylbenzene, 4,4'-sulfonyl diphenol and 1,1-bis-(4-hydroxyphenyl)-3,3,5-trimethylcyclohexane.

Examples of particularly preferred aromatic bisphenols are 2,2-bis-(4-hydroxyphenyl)-propane, 2,2-bis-(3,5-dimethyl-4-hydroxyphenyl)-propane, 1,1-bis-(4-hydroxyphenyl)-cyclohexane and 1,1-bis-(4-hydroxyphenyl)-3,3,5-trimethylcyclohexane.

The most preferred bisphenol is 2,2-bis-(4-hydroxyphenyl)-propane (bisphenol A).

The polycarbonates of the invention may entail in their structure units derived from one or more of the suitable bisphenols.

Among the resins suitable in the practice of the invention is phenol-phthalein-based polycarbonate, copolycarbonates and terpolycarbonates such as are described in U.S. Pat. Nos. 3,036,036 and 4,210,741, both incorporated by reference herein.

The polycarbonates of the invention may also be branched by condensing therein small quantities, e.g., 0.05 to 2.0 mol % (relative to the bisphenols) of polyhydroxy compounds.

Polycarbonates of this type have been described, for example, in German Offenlegungsschriften 1,570,533; 2,116,974 and 2,113,374; British Patents 885,442 and 1,079,821 and U.S. Pat. No. 3,544,514. The following are some examples of polyhydroxy compounds which may be used for this purpose: phloroglucinol; 4,6-dimethyl-2,4,6-tri-(4-hydroxy-phenyl)-heptane; 1,3,5-tri-(4-hydroxyphenyl)-benzene; 1,1,1-tri-(4-hydroxyphenyl)-ethane; tri-(4-hydroxyphenyl)-phenylmethane; 2,2-bis-[4,4-(4,4'-dihydroxydiphenyl)]-cyclohexyl-propane; 2,4-bis-(4-hydroxy-1-isopropylidine)-phenol; 2,6-bis-(2'-dihydroxy-5'-methylbenzyl)-4-methyl-phenol; 2,4-dihydroxybenzoic acid; 2-(4-hydroxyphenyl)-2-(2,4-dihydroxy-phenyl)-propane and 1,4-bis-(4,4'-dihydroxytriphenylmethyl)-benzene. Some of the other polyfunctional compounds are 2,4-dihydroxy-benzoic acid, trimesic acid, cyanuric chloride and 3,3-bis-(4-hydroxyphenyl)-2-oxo-2,3-dihydroindole.

In addition to the polycondensation process mentioned above, other processes for the preparation of the polycarbonates of the invention are polycondensation in a homogeneous phase and transesterification. The suitable processes are disclosed in the incorporated herein by reference, U.S. Pat. Nos. 3,028,365; 2,999,846; 3,153,008; and 2,991,273.

The preferred process for the preparation of polycarbonates is the interfacial polycondensation process.

Other methods of synthesis in forming the polycarbonates of the invention such as disclosed in U.S. Pat. No. 3,912,688, incorporated herein by reference, may be used.

Suitable polycarbonate resins are available in commerce, for instance, Makrolon 2400, Makrolon 2600, Makrolon 2800 and Makrolon 3100 resins, all of which are bisphenol based homopolycarbonate resins differing in terms of their respective molecular weights and characterized in that their melt flow indices (MFR) per ASTM D-1238 are about 16.5 to 24, 13 to 16, 7.5 to 13.0 and 3.5 to 6.5 g/10 min., respectively. Especially suitable is Makrolon 2500 having an MFR value of 14 to 17 g/10 min. These are products of Bayer Corporation of Pittsburgh, Pa.

A polycarbonate resin suitable in the practice of the invention is known and its structure and methods of preparation have been disclosed, for example, in U.S. Pat. Nos. 3,030,331; 3,169,121; 3,395,119; 3,729,447; 4,255,556; 4,260,731; 4,369,303 and 4,714,746 all of which are incorporated by reference herein.

The stabilizing agent in the context of the invention conforms structurally to

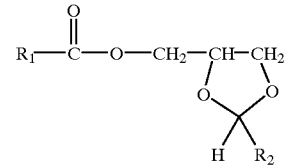

where $R_1$ denotes a $C_{1-30}$-alkyl group and $R_2$ denotes an aryl radical. The aryl radical may be substituted; the substituents include linear and branched alkyl groups, cycloalkyl and alkoxy groups, and halogen atoms. The preferred aryl radical is a member selected from the group consisting of phenyl, naphthyl, anthracenyl, phenanthryl and biphenyl.

The stabilizer in the present context may be synthesized by conventional methods such as are described in Organic Synthesis, III, 502 (1955). A suitable stabilizer conforming structurally to

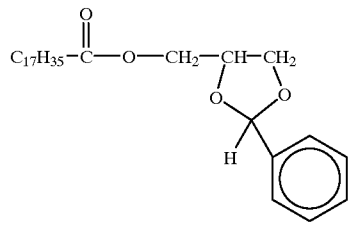

was prepared by reacting glycerol monostearate with benzaldehyde in the presence of an acid catalyst.

Conventional additives may also be incorporated in the composition for their art-recognized utility. These include dyes, flame retardants, release agents, plasticizers, thermal, hydrolytic and UV stabilizers, antioxidants, fillers, reinforcements and the like. Among the useful thermal stabilizers are hindered phenols, phosphines, phosphites, phosphates and sulfides which may advantageously be added to the stabilized composition of the invention. In a preferred embodiment, the inventive composition contains no magnetic components of any kind.

The invention is further illustrated but is not intended to be limited by the following examples in which all parts and percentages are by weight unless otherwise specified.

The preparation of the stabilized compositions of the invention is conventional.

EXPERIMENTAL

A stabilizer in accordance with the invention (herein "Stabilizer") has been prepared as noted above by reacting glycerol monostearate with benzaldehyde in the presence of an acid catalyst. The preparation is described below:

To a 250 mL round bottom flask equipped with a Dean Stark trap and condenser, was added 10 g (27.80 mmol) of glycerin monostearate, 75 mL of dry toluene, 0.09 g (~1%) of p-toluenesulfonic acid monohydrate, and 3.4 mL (34 mmol) of benzaldehyde. The reaction was allowed to reflux with stirring until the theoretical amount of water was collected (~0.5 mL) via the Dean-Stark trap. Once the reaction was complete, the solvent was removed by distillation. The residual molten material was added to 280 mL of methanol and allowed to cool slowly to room temperature to precipitate the product. To ensure that all the material had precipitated, 70 mL of DI-$H_2O$ (to make a 20% solution) was added slowly. The product was then collected via vacuum filtration and dried under reduced pressure.

The Preparation of the Inventive Composition

The Stabilizer was incorporated in a bisphenol-A based homopolycarbonate resin having a weight average molecular weight of about 2600, (PC), and articles were molded conventionally. The test specimens were evaluated as to their yellowness indices (YI) and haze in accordance with the procedures described in ASTM D 1925. Test specimens were exposed to 5 Mrad ionization radiation (Co-60 source) for 457 minutes; the irradiated specimens were stored in darkness and at the indicated intervals were evaluated as to their yellowness index and haze. The results of the evaluations are shown in the table below:

What is claimed is:

1. A thermoplastic transparent molding composition comprising a polycarbonate resin and about 0.1 to 2.0 percent relative to the weight of the polycarbonate, of a stabilizer conforming structurally to

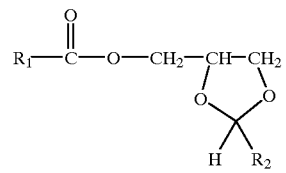

where $R_1$ denotes a $C_{1-30}$-alkyl group and $R_2$ denotes an aryl radical.

2. The thermoplastic molding composition of claim 1 wherein said stabilizer is present in an amount of 0.1 to 1.0 percent.

3. The thermoplastic molding composition of claim 1 wherein said polycarbonate has a weight average molecular weight of 15,000 to 80,000.

4. The thermoplastic molding composition of claim 1 wherein polycarbonate is derived from at least one member selected from the group consisting of dihydroxy compounds conforming to structural formulae (1) and (2)

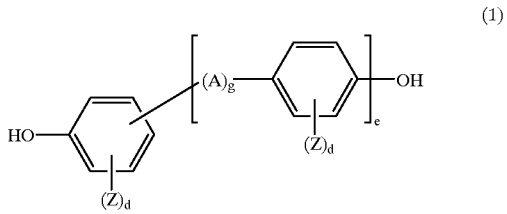

| Components | Example 1 | Example 2 | Example 3 | Example 4 | Example 5 |
|---|---|---|---|---|---|
| Polycarbonate, wt. % | 100 | 99.75 | 99.50 | 99.25 | 99.00 |
| Stabilizer, wt. % | 0 | 0.25 | 0.50 | 0.75 | 1.0 |
| Properties | | | | | |
| Yellowness Index | | | | | |
| Pre-irradiation | 3.5 | 2.85 | 2.69 | 3.53 | 6.35 |
| 0 days after irradiation | 26.36 | 22.16 | 17.85 | 16.40 | 17.74 |
| 2 days after irradiation | 26.00 | 21.86 | 17.74 | 16.40 | 17.70 |
| 7 days after irradiation | 26.08 | 21.95 | 18.56 | 17.26 | 18.50 |
| 14 days after irradiation | 24.42 | 20.77 | 17.59 | 16.21 | 17.57 |
| Delta Yellowness Index* | 1.94 | 1.39 | 0.26 | 0.19 | 0.17 |

*Delta YI refers to the difference in YI between 0 days and 14 days after irradiation.

The resulting difference in the yellowness indices show the efficacy of the stabilizer of the invention in improving the resistance of the composition to gamma radiation-induced yellowing.

Although the invention has been described in detail in the foregoing for the purpose of illustration, it is to be understood that such detail is solely for that purpose and that variation can be made therein by those skilled in the art without departing from the spirit and scope of the invention except as it may be limited by the claims.

-continued

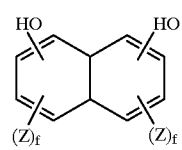

wherein
   A denotes an alkylene group with 1 to 8 carbon atoms, an alkylidene group with 2 to 8 carbon atoms, a cycloalkylene group with 5 to 15 carbon atoms, a cycloalkylidene group with 5 to 15 carbon atoms, a carbonyl group, an oxygen atom, a sulfur atom, —SO— or —SO$_2$ or a radical conforming to

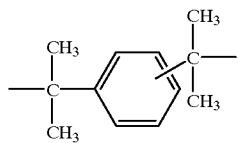

e and g both denote the number 0 to 1;
   Z denotes F, Cl, Br or C$_1$–C$_4$-alkyl and if several Z radicals are substituents in one aryl radical, they may be identical or different from one another;
   d denotes an integer from 0 to 4; and
   f denotes an integer from 0 to 3.

5. The thermoplastic molding composition of claim 1 wherein polycarbonate is derived from at least one member selected from the group consisting of 2,2-bis-(4-hydroxyphenyl)-propane, 2,4-bis-(4-hydroxyphenyl)-2-methyl-butane, 1,1-bis-(4-hydroxyphenyl)-cyclohexane, α,α'-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulfide, bis-(3,5-dimethyl-4-hydroxyphenyl)-sulfoxide, bis-(3,5-dimethyl-4-hydroxyphenyl)-sulfone, dihydroxy-benzophenone, 2,4-bis-(3,5-dimethyl-4-hydroxyphenyl)-cyclohexane, α,α'-bis-(3,5-dimethyl-4-hydroxyphenyl)-p-diisopropylbenzene, 4,4'-sulfonyl diphenol and 1,1-bis-(4-hydroxyphenyl)-3,3,5-trimethylcyclohexane.

6. The thermoplastic molding composition of claim 1 wherein polycarbonate is a homopolymer derived from 2,2-bis-(4-hydroxyphenyl)-propane.

7. The thermoplastic molding composition of claim 1 wherein aryl radical is a member selected from the group consisting of phenyl, naphthyl, anthracenyl, phenanthryl and biphenyl.

8. The thermoplastic molding composition of claim 1 wherein aryl radical is substituted by at least one member selected from the group consisting of linear alkyl group, branched alkyl group, cycloalkyl group, alkoxy group and halogen atoms.

* * * * *